United States Patent [19]

Tucker

[11] 4,109,565
[45] Aug. 29, 1978

[54] COFFEE PERCOLATOR

[76] Inventor: Robert R. Tucker, 3212 E. Captain Dreyfus, Phoenix, Ariz. 85032

[21] Appl. No.: 792,466

[22] Filed: Apr. 29, 1977

[51] Int. Cl.² ............................................. A47J 31/053
[52] U.S. Cl. ......................................... 99/283; 99/310
[58] Field of Search ................. 99/283, 299, 307, 308, 99/310, 311, 312, 313, 314, 315, 300, 302 R, 293, 292, 280, 281, 282; 417/207, 208, 209

[56] References Cited

U.S. PATENT DOCUMENTS

| 1,582,685 | 4/1926 | Pence | 99/283 |
| 1,743,342 | 1/1930 | Halstead | 417/209 |
| 2,046,710 | 7/1936 | Umstott | 99/281 |
| 3,333,527 | 8/1967 | Bender | 99/283 |

*Primary Examiner*—Robert W. Jenkins
*Attorney, Agent, or Firm*—Cahill, Sutton & Thomas

[57] ABSTRACT

A coffee percolator includes conventional elements such as an electrical heating element, an on/off switch for energizing the heating element and a thermostatic switch for deactivating the heating element when the brewing coffee reaches a predetermined first temperature. The coffee percolator further includes a conventional pump and a coffee ground receptacle disposed in the upper portion of the inner chamber of the percolator. The invention resides in the inclusion of a temperature actuated pump for deactivating the pump when the temperature of the fluid in the inner chamber of the percolator is less than a second temperature. The second temperature is below the first temperature which activates the thermostatic switch. The temperature actuated pump control means includes an aperture disposed in the coffee pump to release fluid under pressure from the pump and thereby to disable the pump at low fluid temperatures. A thermostatically actuated valve closes off the aperture in the pump when the temperature of the fluid in the chamber exceeds the second temperature and uncovers the aperture when the temperature of the fluid in the chamber falls below the second temperature. In this manner only fluid having a temperature greater than the second temperature is pumped over the coffee grounds in the receptacle and the flow of heated fluid over the coffee grounds is terminated by the thermostatic switch when the temperature of the fluid reaches the first temperature.

10 Claims, 4 Drawing Figures

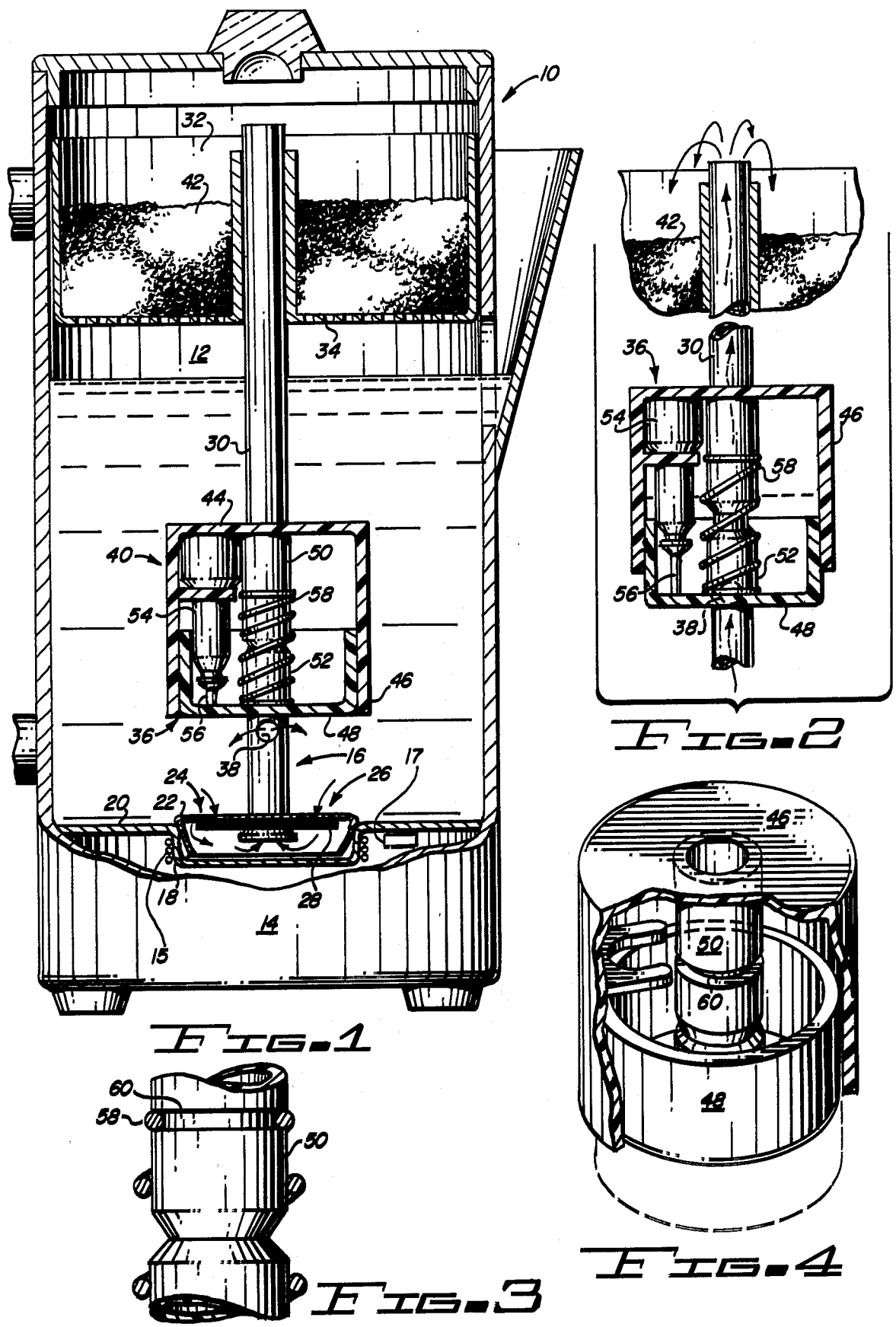

COFFEE PERCOLATOR

BACKGROUND OF THE INVENTION

1. Field of the Invention

This invention relates to coffee percolators, and more particularly to a temperature actuated pump control means for a coffee percolator.

2. Description of the Prior Art

Two basic types of apparatus are used for brewing coffee. Drip coffee brewing apparatus heats water to a temperature near the boiling point and then dispenses the heated water into a chamber containing coffee grounds surrounded by a filter. The heated water passes over the coffee grounds only a single time and yields coffee having a desirable flavor. The coffee percolator brews coffee in a substantially different way. Once energized the percolator virtually immediately begins pumping relatively cool water up a fountain tube and into a coffee ground receptacle containing coffee grounds. The water dispensed into the coffee ground receptacle is at first relatively cool but toward the end of the brewing cycle becomes quite warm. Coffee flavored water trickles from the perforated lower portion of the coffee ground receptacle and is mixed with the warming water in the inner chamber of the coffee percolator.

It is well known to those skilled in the art that aeration of coffee flavored water chemically alters the flavor of the coffee as it is brewed and causes it to assume an unpleasant bitter taste. In the electrically heated coffee percolators, this undesirable aeration is caused by bubbles being entrained in the heated water which is pumped up the fountain tube of the percolator and generally by the exposure of the coffee flavored water to the air as it is discharged from the upper portion of the fountain tube into the coffee ground receptacle. The continuous recirculation of the heated coffee flavored water over the coffee grounds not only increases the strength of the coffee, but also increases the bitterness of the coffee.

The drip method of coffee brewing produces coffee having a superior taste since the exposure of the liquid coffee to air is reduced to an absolute minimum. The inherent disadvantage of drip brewing apparatus resides in their high purchase price and their failure to fully extract all the flavor present in the coffee grounds since heated water is passed over the grounds only a single time.

A number of attempts have been made in the past to modify a percolator having a heat powered pump into an apparatus capable of brewing coffee by the drip method.

U.S. Pat. No. 1,582,685 (Pence) discloses a dual chambered coffee percolator having a steam powered water pump which is thermostatically controlled. A thermostatically actuated plug closes off an aperture in the lower portion of the fountain tube element of the pump until the water in the lower chamber of the percolator has reached a predetermined temperature. Upon reaching that temperature the thermostat removes the plug from the fountain tube and the pump commences operation, causing heated water to be dispensed through the raw coffee into the upper chamber of the percolator.

The difficulty with the Pence apparatus is that it performs a function which is accomplished in a much more satisfactory manner by the present day drip coffee percolators. The Pence apparatus is expensive in that it contains a number of chambers and a relatively complicated, non-replaceable pump control means. The Pence percolator similarly circulates the water only a single time over the raw coffee in the coffee basket.

U.S. Pat. No. 2,046,710 (Umstott) discloses a coffee percolator similar to that taught by Pence. The Unstott percolator is designed to brew coffee by the drip method and includes a thermostatically actuated percolator pump and a dual chambered percolator container.

U.S. Pat. No. 1,743,342 (Halstead) discloses a conventional coffee percolator having an improved valve apparatus which causes the coffee pump to be intermittently actuated as the temperature of the water in a small compartment at the lower end of the pump is heated to a temperature near its boiling point. As the water in the small pump chamber is converted to steam, a valve is closed and a pulse of hot water is pumped up the fountain tube and over the coffee grounds. The inherent disadvantage of this apparatus is that its long percolating cycle continuously aerates the coffee flavored water and gives the coffee a bitter flavor.

Other patents disclosing various other types of coffee brewing apparatus are disclosed in the following U.S. Pat. Nos.: 1,995,081 (Sommers); 1,696,451 (Rankin); 2,742,927 (Frumet); 2,975,723 (Andrews); 3,103,872 (Kircher); and 3,856,435 (Ballard).

SUMMARY OF THE INVENTION

It is therefore a primary object of the present invention to provide a coffee percolator which minimizes the exposure of liquid coffee to air during the brewing cycle.

Another object of the present invention is to provide a coffee percolator which substantially reduces the time required to brew a pot of coffee.

Yet another object of the present invention is to provide a coffee percolator which utilizes a lesser quantity of raw coffee to brew a perdetermined amount of liquid coffee.

Still another object of the present invention is to provide a coffee percolator which includes a single chamber for retaining either water or liquid coffee.

Yet another object of the present invention is to provide a coffee percolator which includes a temperature actuated pump control means which can readily be replaced in the event of a mechanical failure thereof.

A still further object of the present invention is to provide a coffee percolator having a temperature actuated pump control means which is uncomplicated and inexpensive.

Briefly stated, and in accord with one embodiment of the invention, a coffee percolator includes a single chamber for holding a quantity of fluid and a heating element disposed in the lower portion of the percolator for heating the fluid in the chamber. A switch includes a first thermostat and serves to initially actuate the heating element and to subsequently deactivate the heating element after the temperature of the fluid reaches a first temperature. A pump means includes a hollow tube having an upper and a lower opening and extends upwardly from the lower portion of the chamber to pump heated fluid into the lower opening of the tube, upwardly through the tube and out of the upper opening in the tube. A coffee ground receptacle is disposed in the chamber about the upper portion of the tube and includes a perforated lower surface. The coffee ground receptacle retains coffee grounds, receives heated fluid discharged from the upper opening of the tube and releases heated coffee flavored fluid from the lower surface of the receptacle into the chamber.

The improvement of this coffee percolator over prior art devices comprises a temperature actuated pump control means coupled to the pump means for deactivating the pump means when the temperature of the fluid in the chamber is less than a second temperature below the first temperature. The temperature actuated pump control means includes an aperture disposed in the pump means for releasing fluid under pressure from the pump means and thereby disabling the pump means. A thermostatically actuated valve means closes off the aperture when the temperature of the fluid in the chamber exceeds the second temperature and uncovers the aperture when the temperature of the fluid in the chamber falls below the second temperature. In this manner only fluid having a temperature greater than the second temperature passes over the coffee grounds in the receptacle and the flow of heated fluid over the coffee grounds is terminated by the first thermostat when the temperature of the fluid reaches the first temperature.

DESCRIPTION OF THE DRAWING

The invention is pointed out with particularity in the appended claims. However, other objects and advantages, together with the operation of the invention, may be better understood by reference to the following detailed description taken in connection with the following illustrations wherein:

FIG. 1 is a partially cutaway view of a coffee percolator of the present invention.

FIG. 2 is a partial sectional view of the temperature actuated pump control means, showing the thermostatically actuated valve means closing off the aperture in the pump means.

FIG. 3 is a partial view of the thermostatically actuated valve means showing the method of coupling the spring means to the shaft of the first cup section.

FIG. 4 is a partially cutaway perspective view of the thermostatically actuated valve means with the second thermostat removed therefrom.

DESCRIPTION OF THE PREFERRED EMBODIMENT

In order to better illustrate the advantages of the invention and its contributions to the art, a preferred hardware embodiment of the invention will now be described in some detail.

Referring to FIG. 1, coffee percolator 10 includes a single interior chamber 12 to which a predetermined quantity of water is added prior to brewing a pot of coffee. In the lower portion 14 of the coffee percolator an electrical heating element 15 and a switch means 17, which includes a first thermostat, are provided to controllably heat the quantity of water contained in chamber 12. Actuation of the switch energizes the heating element which heats the water. All of the above-described elements, including the first thermostat, are of a type conventionally supplied in commercially available coffee percolators. The first thermostat deenergizes the heating element when the water in chamber 12 reaches a predetermined maximum temperature, such as 180° F. Upon reaching this temperature the coffee brewing cycle is terminated and the heating element is activated at a low level to maintain the brewed coffee in chamber 12 in a warm condition.

Percolator 10 also includes pump means 16 of a design well known to those skilled in the art. The lower portion of pump 16 rests in an indentation 18 in the lower surface 20 of chamber 12. The lower portion of pump means 16 includes a pumping chamber 22 having apertures 24 and 26 and a flapper plate 28 which intermittently seals off apertures 24 and 26 during pumping action. Pump means 16 further includes a hollow tube 30. A coffee ground receptacle 32 is disposed in chamber 12 about the upper portion of tube 30 and includes a perforated lower surface 34. Coffee ground receptacle 32 retains a quantity of coffee grounds 42.

A temperature actuated pump control means 36 is coupled to pump means 16 and includes an aperture 38 and a thermostatically actuated valve means 40. Valve means 40 includes a cup 44 having a first section 46 and a second section 48. First cup section 46 includes a tubular member 50 which surrounds the outer surface of hollow tube 30 and is rigidly attached thereto by an adhesive material or by some other means. Second cup section 48 includes a tubular member 52 which surrounds and is slidably coupled to the outer surface of tube 30.

A temperature sensitive thermostat 54 includes a shaft 56. The body of thermostat 54 is securely coupled to first cup section 46 while shaft 56 contact the inner surface of second cup section 48. In the preferred embodiment a model 98067-A thermostatic actuator manufactured by Robertshaw Controls Company and sold under the trademark Power Pill is used. Thermostat 56 is designed to be actuated at approximately 150° F. Since thermostat 54 will not always fully retract its shaft 56 when the ambient temperature decreases below 150° F., a spring 58 is coupled between tubular members 50 and 52 to bias the shaft of thermostat 54 to the closed position. FIGS. 3 and 4 more clearly indicate the means of connecting the ends of spring 58 to tubular members 50 and 52. An indentation or notch 60 is provided in a portion of each tubular member to secure spring 58 thereto.

The manner of operation of coffee percolator 10 will now be described. Referring to FIG. 1, a measured amount of water having a temperature in the range of 70° to 80° F. is placed in chamber 12. Since the temperature of the water is below 150° F. shaft 56 of thermostat 54 will be retracted permitting spring 58 to retract second cup section 48 into first cup section 46. This position of valve means 40 exposes aperture 38.

The heat flowing from the heating element through indentation 18 and lower surface 20 of chamber 12 causes the cool water in chamber 12 to circulate through apertures 24 and 26 in pumping chamber 22, up through hollow tube 30 and out of aperture 38 in the manner indicated by the arrows in FIG. 1. This forceful water circulation provided by pump means 16 mixes the partially heated water emanating from aperture 38 with the cooler water in chamber 12, substantially increasing the efficiency of the heating element and thereby decreasing the time required to heat the water in chamber 12.

Referring now to FIG. 2, the temperature actuated pump control means 36 is shown in the closed position. The temperature of the water in chamber 12 has now been heated to 150° F. causing shaft 56 to fully extend from the body of thermostat 54. This displacement of shaft 56 causes tubular member 52 to slide over and close off aperture 38 in tube 30. The closure of aperture 38 causes the pressurized flow of water produced by pump means 16 to be directed upward through hollow tube 30 and out the top thereof as indicated by the arrows in FIG. 2. Thus only water having a temperature greater than 150° F. comes in contact with coffee grounds 42. When the temperature of the water in chamber 12 reaches 180° F. the first thermostat in the switch means of percolator 10 deactivates the heating element of the percolator and terminates the flow of water through tube 30 onto the coffee grounds 42 in the coffee ground retainer 32.

To produce six six ounce cups of coffee, prior art electric coffee percolators require approximately 14 to 20 minutes from the initiation of a brewing cycle to the completion thereof. During this entire time interval partially heated water is pumped through the pump over the coffee grounds and back into the fluid chamber of the percolator. This continuous pumping action also continuously aerates the coffee/water combination creating the bitter aftertaste referred to above.

For a similar 36-ounce quantity of water in chamber 12, the present invention heats the water for approximately 6 minutes during which time aperture 38 is exposed and no heated water is pumped out of the upper end of tube 30. After 6 minutes has elapsed, the temperature of the water in chamber 12 will reach 150° F. activating the temperature actuated pump control means 40 to close off aperture 38 and cause heated water to be pumped over coffee grounds 42. Approximately 3 to 4 minutes later the fluid will attain a temperature of 180° F. and the brewing cycle will be terminated. Thus the present invention aerates the coffee saturated water for a 3 to 4 minute period of time which is approximately 80 percent less than prior art percolators. Furthermore, the present invention completes the entire brewing cycle in approximately 10 minutes as compared to the approximate 14 to 20 minute time interval required for prior art devices.

An added advantage of the present invention is that during the 3 to 4 minute percolation cycle, the maximum amount of flavor is removed from the coffee grounds. The prior art drip grind coffee brewing apparatus operate on a similar principle, but only pass heated water over the grounds a single time. Because of the recirculation of very high temperature water over the coffee grounds virtually all coffee flavor can be extracted from the grounds and an approximately one-third smaller quantity of coffee grounds can be used to attain the desired strength of coffee and a substantial savings can be realized by the user.

Since the pump means 16, the valve means 40 and the tube 30 are removeable from the percolator 10 and can be manufactured to be adaptable to a number of existing coffee percolator designs, the design of the present invention can readily be adapted to function as a retrofit item in commercially available coffee percolators.

It will be apparent to those skilled in the art that the disclosed coffee percolator may be modified in numerous other ways and may assume many other embodiments other than the preferred forms specifically set out and described above. For example, the first and second sections of cup 44 have been provided to form a substantially water tight compartment to prevent the intermixture of the water in chamber 12 with the functioning elements of valve means 40. This is done as a precautionary measure to preclude contamination of the water by the metallic elements of thermostat 54. It would be possible to eliminate a substantial portion of cup 44 were this water tight feature eliminated. Furthermore, many other different types of thermostatically actuated devices could be used to serve as the temperature actuated pump control means. Accordingly, it is intended by the appended claims to cover all such modifications of the invention which fall within the true spirit and scope of the invention.

What is claimed is:

1. In a coffee percolator including:
   (a) a single chamber for holding a quantity of fluid in said percolator, said chamber having an upper and a lower portion;
   (b) a heating element disposed in the lower portion of said percolator for heating the fluid in said chamber;
   (c) switch means including a first thermostat for initially actuating said heating element and for deactivating said heating element after the fluid attains a first temperature;
   (d) pump means including a hollow tube having an upper and a lower opening and extending upwardly from the lower portion of said chamber for pumping heated fluid into the lower opening of said tube, upwardly through said tube and out of the upper opening in said tube; and
   (e) a coffee ground receptacle disposed in said chamber about the upper portion of said tube and having a perforated lower surface for retaining coffee grounds, for receiving heated fluid discharged from the upper opening of said tube and for releasing heated coffee flavored fluid from the lower surface of said receptacle into said chamber;
   the improvement comprising:
   (a) temperature actuated pump control means coupled to said pump means for deactivating said pump means when the temperature of the fluid in said chamber is less than a second temperature below the first temperature including
      (i) an aperture disposed in said pump means for releasing fluid under pressure from said pump means and thereby disabling said pump means; and
      (ii) thermostatically actuated valve means for closing off said aperture when the temperature of the fluid in said chamber exceeds the second temperature and for uncovering said aperture when the temperature of the fluid in said chamber falls below the second temperature;
   whereby only fluid having a temperature greater than the second temperature passes over the coffee grounds in said receptacle and the flow of heated fluid over the coffee grounds is terminated by said first thermostat when the temperature of the fluid reaches the first temperature.

2. The coffee percolator according to claim 1 wherein said pump means is removeable from said chamber to facilitate cleaning thereof.

3. The coffee percolator according to claim 1 wherein said valve means includes a second thermostat having a body coupled to said pump means and including a shaft which extends from said second thermostat when the temperature of the water exceeds the second temperature.

4. The coffee percolator according to claim 3 wherein said valve means includes a sleeve surrounding and slidably coupled to the outer surface of said tube and contacting the shaft of said second thermostat, whereby the extension of said shaft from said second thermostat causes said sleeve to close off said aperture when the temperature of the water in said chamber exceeds the second temperature.

5. The coffee percolator according to claim 4 wherein said sleeve and said aperture are disposed in the lower portion of said tube.

6. The coffee percolator according to claim 5 wherein said valve means further includes a cup having first and second sections, said second cup section being slidably moveable within said first cup section and said first cup section being rigidly coupled to said tube while said second cup section is coupled to said sleeve and slidably moveable therewith.

7. The coffee percolator according to claim 6 wherein the body of said second thermostat is rigidly coupled to said first cup section.

8. The coffee percolator according to claim 7 wherein said valve means further includes spring means coupled to said first and said second cup sections for retracting said second cup section into said first cup section and forcefully retracting the shaft into the body of said second thermostat when the temperature of the water falls below the second temperature.

9. The coffee percolator according to claim 8 wherein the seal between said first and second cup sections is watertight.

10. The coffee percolator according to claim 9 wherein the seal between said first and said second cup sections and said tube is watertight.

* * * * *